US008762999B2

(12) United States Patent
Johnson et al.

(10) Patent No.: US 8,762,999 B2
(45) Date of Patent: Jun. 24, 2014

(54) GUEST-INITIATED RESOURCE ALLOCATION REQUEST BASED ON COMPARISON OF HOST HARDWARE INFORMATION AND PROJECTED WORKLOAD REQUIREMENT

(75) Inventors: Darrin P. Johnson, San Jose, CA (US); Eric C. Saxe, Livermore, CA (US); Jonathan J. Chew, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1642 days.

(21) Appl. No.: 11/863,157

(22) Filed: Sep. 27, 2007

(65) Prior Publication Data
US 2009/0089780 A1   Apr. 2, 2009

(51) Int. Cl.
G06F 9/455 (2006.01)
G06F 15/163 (2006.01)
G06F 9/50 (2006.01)

(52) U.S. Cl.
CPC .............. *G06F 9/455* (2013.01); *G06F 9/5077* (2013.01)
USPC ................ 718/104; 718/1; 709/224; 709/226

(58) Field of Classification Search
USPC ........... 709/203, 204, 205, 206; 713/1; 718/1, 718/104
See application file for complete search history.

(56) References Cited

U.S. PATENT DOCUMENTS

| | | | |
|---|---|---|---|
| 7,092,946 B2* | 8/2006 | Bodnar ................................. 1/1 |
| 7,366,134 B2* | 4/2008 | Bose et al. ..................... 370/329 |
| 7,412,492 B1* | 8/2008 | Waldspurger ................. 709/216 |
| 2002/0053032 A1* | 5/2002 | Dowling et al. ............... 713/201 |
| 2002/0120744 A1* | 8/2002 | Chellis et al. .................. 709/226 |
| 2002/0156934 A1* | 10/2002 | Gregg et al. .................. 709/319 |
| 2003/0037092 A1* | 2/2003 | McCarthy et al. ............ 709/104 |
| 2003/0225827 A1* | 12/2003 | Andersen et al. ............. 709/203 |
| 2004/0064558 A1* | 4/2004 | Miyake ......................... 709/226 |
| 2004/0111520 A1* | 6/2004 | Krantz et al. ................. 709/229 |
| 2004/0139437 A1* | 7/2004 | Arndt ............................ 718/100 |
| 2004/0158619 A1* | 8/2004 | Pedersen et al. .............. 709/219 |
| 2004/0172474 A1* | 9/2004 | Markaryan et al. ........... 709/228 |
| 2004/0243534 A1* | 12/2004 | Culter et al. ...................... 707/1 |
| 2004/0243835 A1* | 12/2004 | Terzis et al. ................... 713/200 |
| 2005/0033948 A1* | 2/2005 | Wei .................................. 713/1 |
| 2005/0039183 A1* | 2/2005 | Romero et al. ............... 718/100 |
| 2005/0228855 A1* | 10/2005 | Kawato ......................... 709/200 |
| 2005/0246666 A1* | 11/2005 | Kalinoski et al. ............. 715/963 |
| 2006/0005198 A1* | 1/2006 | Uchishiba et al. ............ 718/104 |
| 2006/0031105 A1* | 2/2006 | Lee et al. .......................... 705/5 |
| 2006/0031679 A1* | 2/2006 | Soltis et al. ................... 713/182 |
| 2006/0072541 A1* | 4/2006 | Pecus ............................ 370/351 |

(Continued)

Primary Examiner — Abdullah Al Kawsar
Assistant Examiner — Benjamin Wu
(74) Attorney, Agent, or Firm — Osha Liang LLP

(57) ABSTRACT

In general, embodiments of the invention relates to a method for conveying hardware resources from a host (OS) executing on a computer system. The method includes obtaining host hardware information by the host OS, wherein the host hardware information specifies a plurality of physical hardware components of the computer system, sending the host hardware information to a guest OS executing within the host OS, generating, by the guest OS, a resource request using the host hardware information, sending, by the guest OS, the resource request to the host OS, and in response to receiving the resource request, allocating, by the host OS, guest hardware resources, where the guest hardware resources include at least one of the physical hardware components in the resource request.

20 Claims, 6 Drawing Sheets

(56) References Cited

U.S. PATENT DOCUMENTS

| | | |
|---|---|---|
| 2006/0077967 A1* | 4/2006 | Sienel et al. .................. 370/352 |
| 2006/0136653 A1* | 6/2006 | Traut et al. ........................ 711/6 |
| 2006/0136913 A1* | 6/2006 | Sameske ........................... 718/1 |
| 2006/0143617 A1* | 6/2006 | Knauerhase et al. ......... 718/104 |
| 2006/0242641 A1* | 10/2006 | Kinsey et al. ..................... 718/1 |
| 2007/0011486 A1* | 1/2007 | Li et al. ............................ 714/5 |
| 2007/0028237 A1* | 2/2007 | Bulson et al. .................... 718/1 |
| 2007/0050763 A1* | 3/2007 | Kagan et al. ...................... 718/1 |
| 2007/0067435 A1* | 3/2007 | Landis et al. .................. 709/224 |
| 2007/0101323 A1* | 5/2007 | Foley et al. ....................... 718/1 |
| 2007/0124363 A1* | 5/2007 | Lurie et al. .................... 709/202 |
| 2007/0150599 A1* | 6/2007 | Neogi et al. ................... 709/227 |
| 2007/0168635 A1* | 7/2007 | Allen et al. .................... 711/173 |
| 2007/0198976 A1* | 8/2007 | Leis et al. ......................... 718/1 |
| 2008/0168457 A1* | 7/2008 | Accapadi et al. ............. 718/104 |
| 2009/0025005 A1* | 1/2009 | Holzapfel et al. ............. 718/104 |
| 2009/0055913 A1* | 2/2009 | Fajardo ............................ 726/7 |

\* cited by examiner

US 8,762,999 B2

GUEST-INITIATED RESOURCE ALLOCATION REQUEST BASED ON COMPARISON OF HOST HARDWARE INFORMATION AND PROJECTED WORKLOAD REQUIREMENT

BACKGROUND

Platform virtualization is the process in which a host ("host") may execute virtual machines that that simulate computer hardware for one or more guests processes ("guests"). Each guest is delegated a subset of the hardware resources managed by the host. For example, a host managing dual processors may assign one of the processors to be used exclusively by a guest. Platform virtualization allows for improved management of information technology infrastructure. More specifically, platform virtualization simplifies maintenance because a guest may be quickly reverted to stable state after encountering a fault, and security is enhanced because a compromised guest is isolated from the host and other guests executing on separate virtual machines.

Typically, an administrator and/or the host will determine the hardware resources assigned to virtual machines utilized by one or more guests. However, current virtualization technologies do not include a mechanism to convey the interrelationships between hardware resources to guests. For example, many modern chipsets provide the relative distances between processors and memories on the physical hardware through the Advanced Configuration and Power Interface (ACPI) Static Resource Affinity Table (SRAT), and/or the System Locality Information Table (SLIT). Thus, when using current virtualization technology with Non-Uniform Memory Architecture (NUMA) machines, a virtual machine may be assigned processor and memory resources that are not local to each others resulting in poor guest performance.

SUMMARY

In general, in one aspect, the invention relates to a method for conveying hardware resources from a host (OS) executing on a computer system. The method includes obtaining host hardware information by the host OS, wherein the host hardware information specifies a plurality of physical hardware components of the computer system, sending the host hardware information to a guest OS executing within the host OS, generating, by the guest OS, a resource request using the host hardware information, wherein the resource request comprises a request for at least one of the plurality of physical hardware components, sending, by the guest OS, the resource request to the host OS, and in response to receiving the resource request, allocating, by the host OS, guest hardware resources, wherein the guest hardware resources comprise the at least one of the plurality of physical hardware components in the resource request.

In general, in one aspect, the invention relates to a computer readable medium comprising computer readable program code embodied therein for causing a computer system to obtain host hardware information by a host operating system (OS), wherein the host hardware information specifies a plurality of physical hardware components of the computer system, send the host hardware information to a guest OS, wherein the guest OS is executing within the host OS, generate, by the guest OS, a resource request using the host hardware information, wherein the resource request comprises a request for at least one of the plurality of physical hardware components, send, by the guest OS, the resource request to the host OS, and allocate in response to receiving the resource request, by the host OS, guest hardware resources, wherein the guest hardware resources comprise the at least one of the plurality of physical hardware components in the resource request.

In general, in one aspect, the invention relates to a system. The system includes a plurality of physical hardware components, a host operating system (OS), a first guest OS and a second guest OS executing in the host OS. The host OS is configured to obtain host hardware information, wherein the host hardware information specifies the plurality of physical hardware components, send the host hardware information to a first guest OS and the second guest OS, and receive a first resource request from the first guest OS, receive a second resource request from the second guest OS, determine an allocation of the plurality of physical hardware components based on the first resource request and the second resource request, allocate the plurality of physical hardware components based on the allocation.

DETAILED DESCRIPTION

Figure 1:
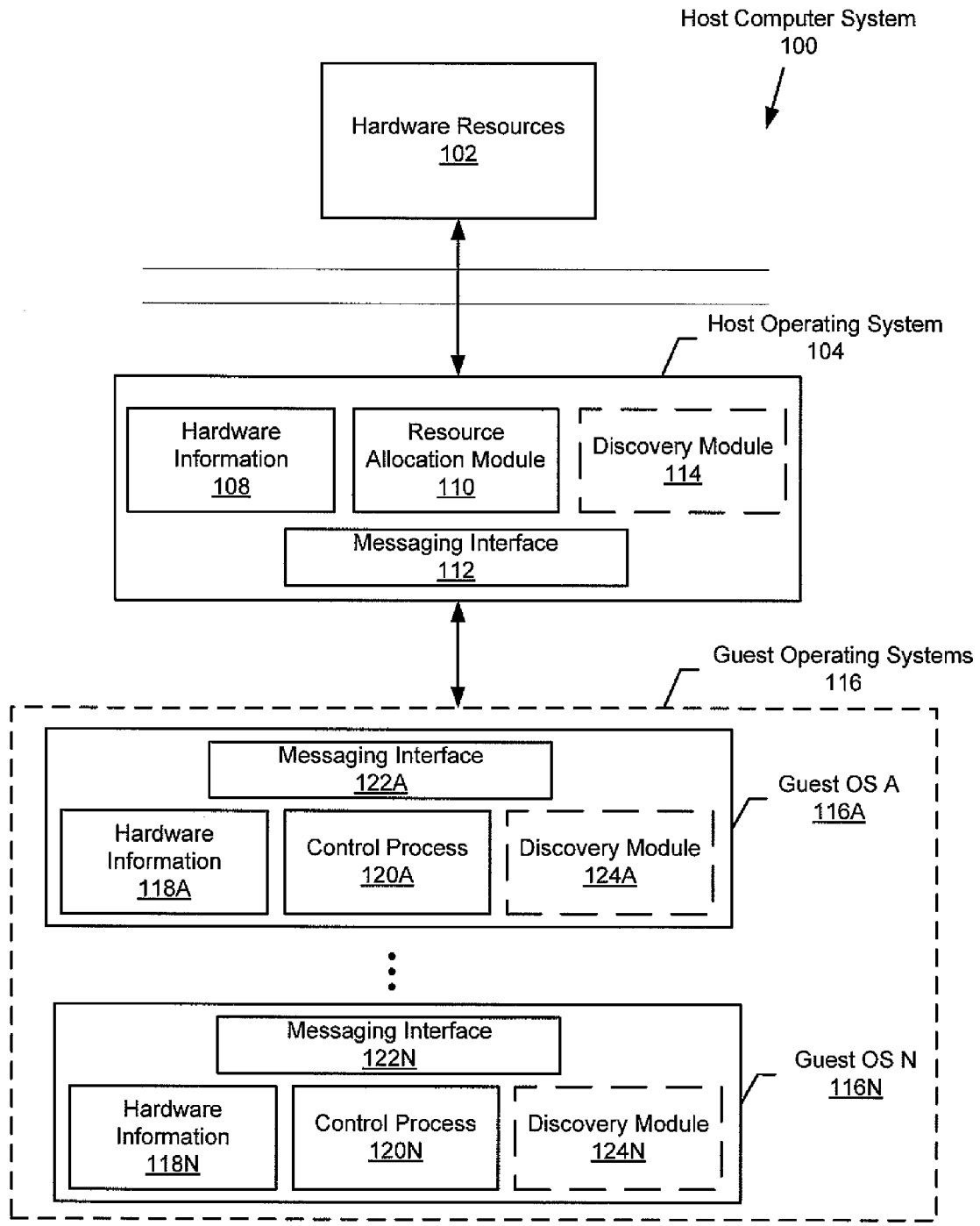
FIG. 1 shows a host computer system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for conveying physical resource relationships. Specifically, embodiments of the invention allow a host to communicate hardware resources to guests, and receive hardware resource requests from said guests.

FIG. 1 shows a host computer system in accordance with one or more embodiments of the invention. The host computer system (100) includes hardware resources (102) managed by a host OS (OS) (104). The host OS (104) includes hardware information (108), a resource allocation module (110), a messaging interface (112), and an optional discovery module (114). The host OS (104) may execute one or more guest OSs (116) simultaneously. Each guest OS (e.g., Guest OS A (116A), Guest OS N (116N)) includes hardware information (118A, 118N), a control process (120A, 120N), a messaging interface (122A, 122N) and an optional discovery module (124A, 124N).

In one or more embodiments of the invention, the hardware resources (102) of the host computer system (100) may include processors, main memory (e.g. Random Access Memory (RAM)), cache memories, permanent storage (e.g., hard drives), networking devices, and/or any hardware components installed in the host computer system (100).

The host OS (104), in one or more embodiments of the invention, manages the hardware resources (102) and applications executing on the host computer system (100). The host OS (104) is configured to support the creation and management of virtual machines for at least one guest OS (e.g. 116A, 116N). In one or more embodiments of the invention, the host OS (104) executes an application for managing the guest OSs (116). For example, the host OS (104) may be Solaris® UNIX running the Xen® virtual machine monitor (Solaris® is a registered trademark of Sun Microsystems of Santa Clara, Calif.; Xen® is a registered trademark of XenSource, Inc. of Palo Alto, Calif.).

Continuing with FIG. 1, in one or more embodiments of the invention the host OS (104) is configured to store hardware information (108) associated with the hardware resources (102) of the host computer system (100) and associated with the virtual machines assigned to the guest OSs (116). The hardware information may include, for example, the number of processors, processor clock frequency, processor cache (e.g., size of processor L1 and L2 cache memories), the size of main memory, available storage devices (e.g. hard drives), and/or networking devices. The hardware information (108) may be stored in arrays, hash tables, flat files, configuration files, and/or any data structure suitable for storing hardware information. For example, ACPI tables for the hardware resources (102) may be stored in a C programming language structure (a "struct") by the host OS (104).

In one or more embodiments of the invention, the resource allocation module (110) is configured to allocate hardware resources for the guest OSs (116). The resource allocation module (110) determines the amount of Central Processing Unit (CPU) speed, main memory, and storage space devoted to each of the guest OSs (116A, 116N). For example, the resource allocation module (110) may determine that half of the processors and main memory should be allocated to the guest OSs (116). Those skilled in the art will appreciate that the resource allocation module (110) may be configured to balance the hardware resource needs of host OS (104) with multiple, competing, guest OSs (116). For example, round-robin scheduling and virtual memory techniques may be used to manage CPU and main memory hardware resources, respectively.

The messaging interface (112) is used by the host OS (104) to communicate resource messages to the guest OSs (116). Resource messages sent by the host (104) to the guest OSs (116) include some or all of the hardware information (108) maintained by the host (104). Additionally, the messaging interface (112) may have the capability to receive resource requests sent by guest OSs (116). The messaging interface (112) may be configured to support any communications protocol suitable for sending and receiving hardware information between the host OS (104) and the guest OSs ((1116) executing on the host OS (104). For example, resource messages may be sent to a guest using interprocess communication. The messaging interface (122A, 122N) of the guest OSs ((1116)) is configured in a similar manner to send resource requests and receive resource messages to/from the host (104).

In one or more embodiments of the invention, the host (104) may include a discovery module (114). The discovery module (114) is configured to discover hardware resources (102), including changes to the hardware resources, and update the hardware information (108). For example, the discovery module may query ACPI tables provided by the chipset, and/or listen for Plug and Play (PnP) interrupts on the bus issued by new and/or updated hardware.

In one or more embodiments of the invention, there are one or more guest OSs (116) executing on the host OS (104). Each guest OS (116A, 116N) includes its own hardware information (118A, 118N), a control process (120A, 120N), and an optional discovery module (124A, 124N). The hardware information (118A, 118N) of the guest OS is similar to the hardware information (108) of the host OS (104) in that it stores the hardware resources allocated to the guest OS. For guest OSs that are fully virtualized (i.e., the guest OS is not aware it is running in a virtual environment), the hardware information (108) may include virtual devices. Alternatively, in embodiments where the guest OS is using paravirtualization (i.e., the guest is configured to be aware of its virtualization) the hardware information (108) may include references to both the physical hardware resources (102) and virtual devices.

In one or more embodiments of the invention, the guest OS (116A, 116N) may use a discovery module (124A, 124N) to determine the configuration of the virtual machine. For example the guest OS may analyze the hardware information (118A, 118N) of the virtual machine to determine the currently allocated hardware resources when the host OS (104) is not configured to provide the hardware information (108) directly.

The control process (120A, 120N) manages the hardware resources of the guest OS. More specifically, the control process (120A, 120N) re-configures the guest OS after receiving resource messages from the host OS (104) via the messaging interface (122A, 122N). For example, the control process (120A, 120N) may appropriately reconfigure the guest OS after receiving a resource message indicating that half of the guest OS's memory is no longer available. In one or more embodiments of the invention, the control process (120A, 120N) may be configured to generate a resource request to update the hardware resources assigned to the guest OS. For example, the processor and main memory assigned to the guest OS may not be local to one another, resulting in poor performance; the control process (120A, 120N) may recognize this situation by analyzing the hardware information (118A, 118N) and alert the host OS (104), via a resource request, that it requires main memory local to its assigned processor. In one or more embodiments of the invention, the control process (120A, 120N) may be an internal component of the kernel of the guest OS.

In one embodiment of the invention, the hardware discovery and deceives added via a hot plug mechanism (i.e., while the host is executing) may be fully virtualized. In such cases, the guest OS can directly discover the virtualized resources on the host OS without requiring messages to be sent from the Host OS to the guest OS.

Figure 2:
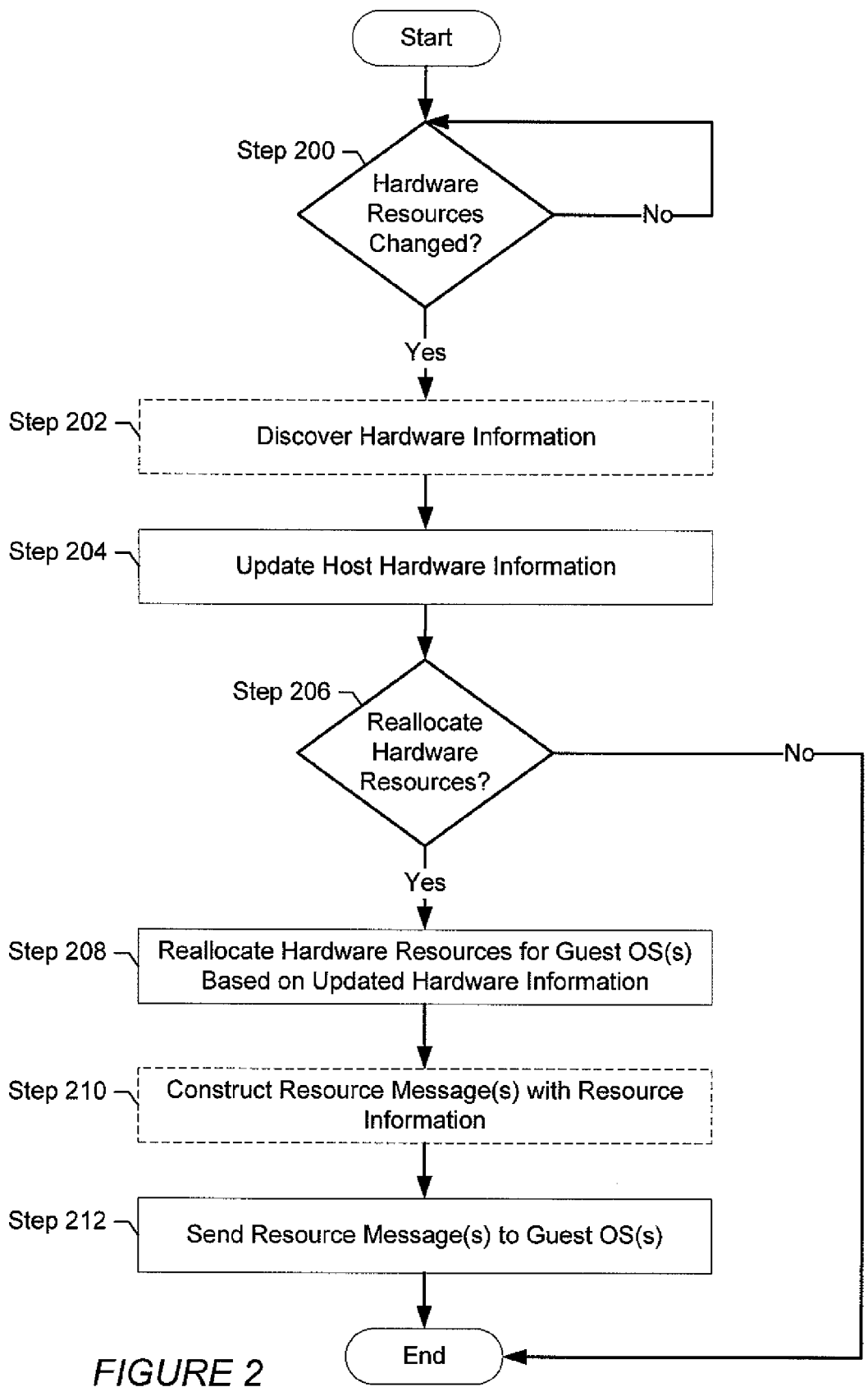
FIG. 2 shows a flowchart for sending resource messages in accordance with one or more embodiments of the invention.
Figure 3:
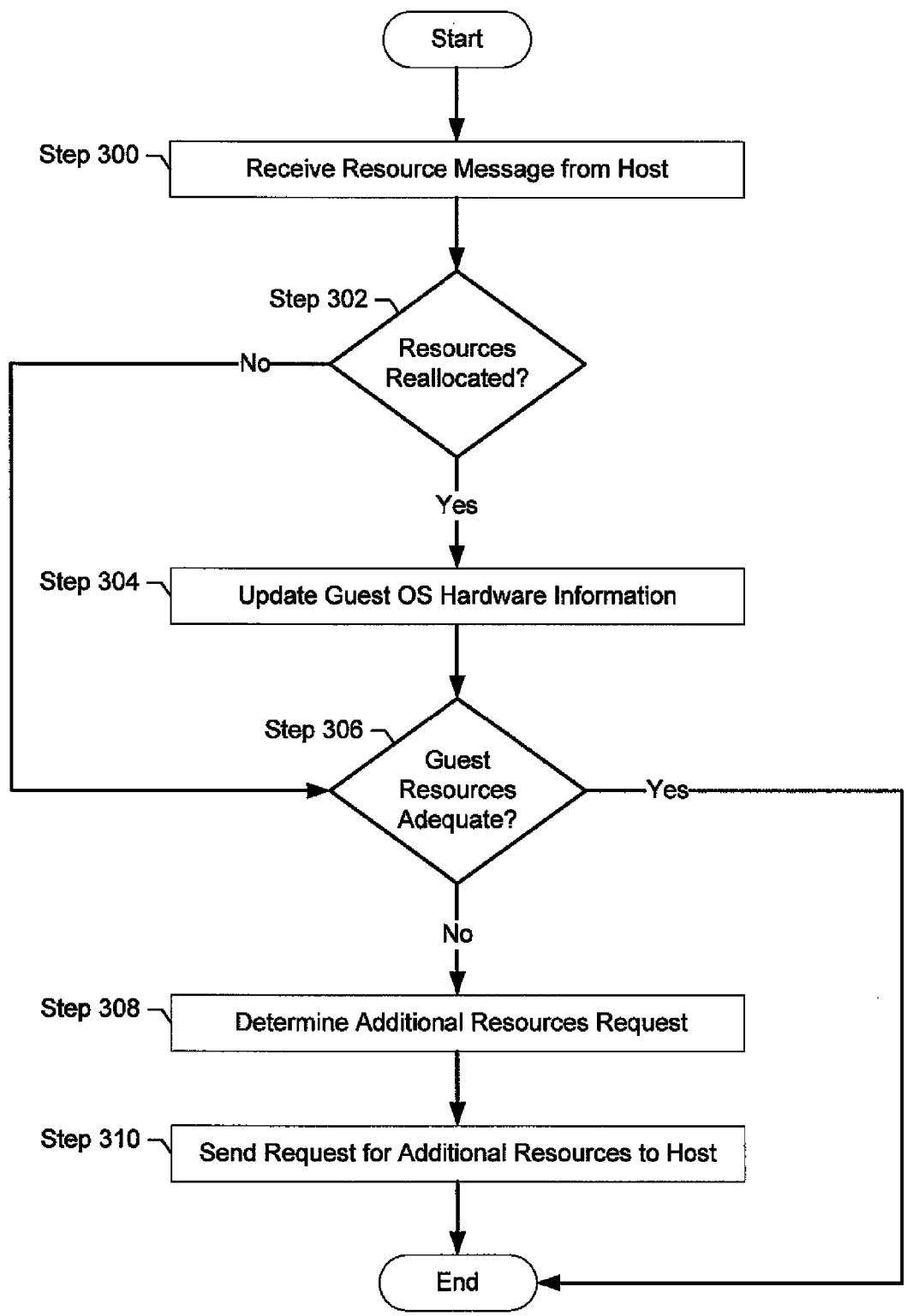
FIG. 3 shows a flowchart for receiving resource messages in accordance with one or more embodiments of the invention.
Figure 4:
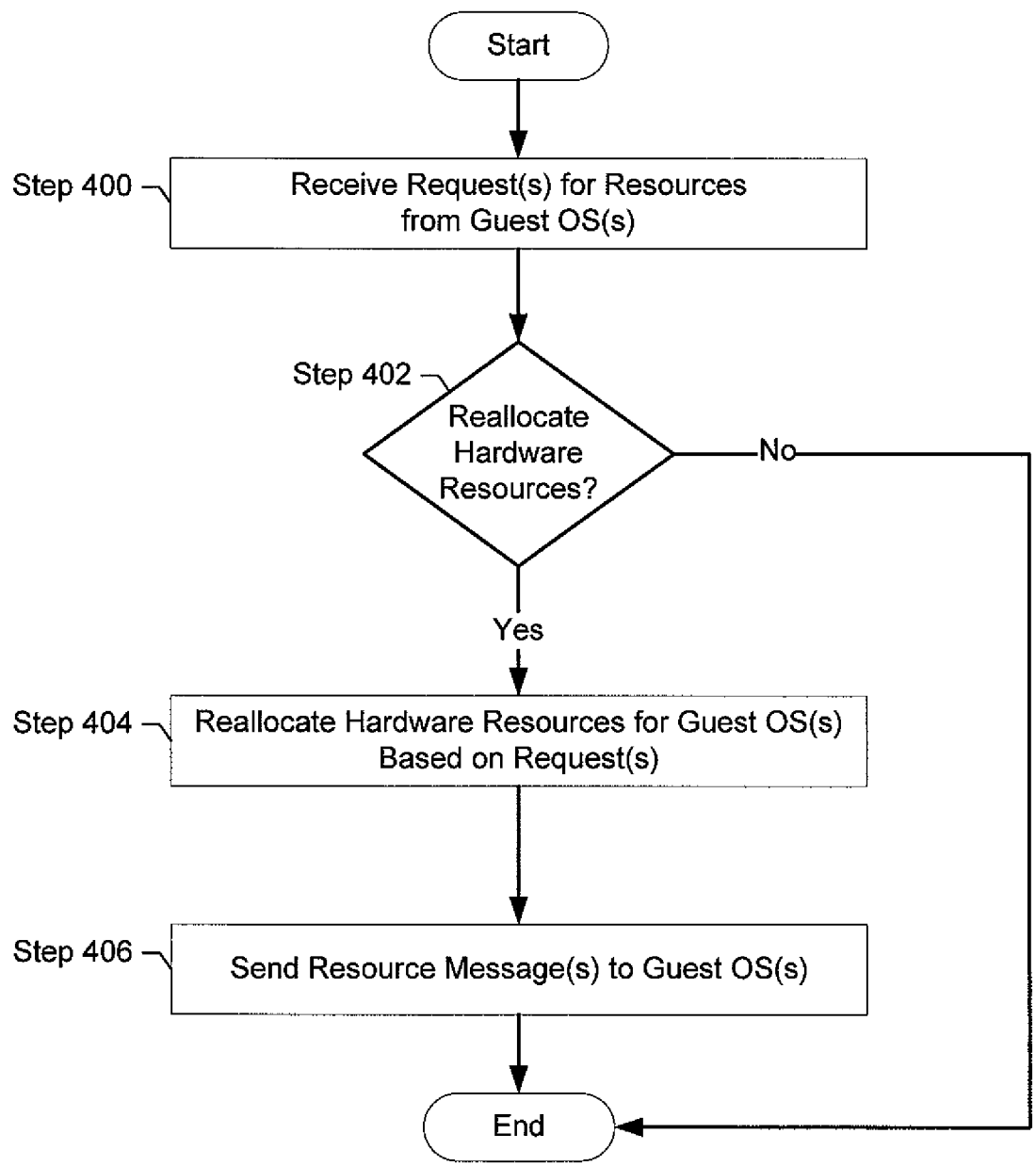
FIG. 4 shows a flowchart for processing a request for resources in accordance with one or more embodiments of the invention.

FIGS. 2-4 show flowcharts of methods for sending resource messages and receiving resource requests. While the various steps in these flowcharts are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIGS. 2-4 should not be construed as limiting the scope of the invention.

FIG. 2 shows a flowchart for sending a resource message from the host OS to a guest OS in accordance with one or more embodiments of the invention. At Step 200, the host OS determines whether the hardware resources have changed. For example, the discovery module of the host OS may intercept a PnP interrupt issued by a Universal Serial Bus (USB) controller indicating that a new external hard drive is available. When no hardware changes have occurred, the host OS loops until it determines the hardware resources have changed (Step 200).

In one or more embodiments of the invention, the host OS discovers the hardware information (Step 202) after determining that the hardware resources have changed (Step 200). For example, the host may scan the Basic Input Output System (BIOS) and/or the Peripheral Component Interconnect (PCI) bus of the hardware resources, and update the hardware information with the new components. The discovery step is optional, because the no discovery is needed in situations where the allocation of hardware resources, rather than the physical hardware itself, has changed. In alternative embodiments of the invention, the discovery step is omitted, allowing guest OSs to discover the hardware information independently of the host OS.

At Step 204, the hardware information of the host OS is updated to reflect the changes in hardware resources. Specifically, the data structures for hardware information maintained by the host OS are updated with corresponding changes in hardware resources. For instance, if additional main memory (e.g. RAM) is added to the host computer system a "memory_size" value in the hardware information may be incremented with the capacity of the newly added memory.

Continuing, with FIG. 2, the resource allocation module of the host OS determines whether to reallocate hardware resources for the guest OS s (Step 206). In particular, the resource allocation module examines the updated hardware information to determine if the new hardware changes warrant updating the allocations provided to each of the guest OSs. The decision of the resource allocation module may be based on a variety of factors, including, but not limited to, the locality of the new hardware resources to the hardware resources currently in use by the guest OSs, the load of the guest OSs, and prior patterns of hardware resource use. In one or more embodiments of the invention, reallocation of hardware resources may be withheld until resource requests are received from all guest OSs within a predetermined quantum of time. When no reallocation of hardware resources is needed, the flow ends.

For example, upon updating the host computer system with additional processors and main memory, the resource allocation module may examine the hardware information for each of the guest OSs to determine an improved allocation. More specifically, the resource allocation module may notice that a guest OS's virtual machine is operating using memory that is not local to, i.e., not on the same bus as, its assigned processor. In these circumstances, the resource allocation module may determine that the guest OS should be migrated to one of the new processors and memory that are on the same bus. In another example, the resource allocation module may notice a guest OS experiencing high load averages, and allocate hardware resources away from another guest OS with low hardware resource utilization.

Continuing with FIG. 2, if the resource allocation module affirmatively determines to reallocate hardware resources (Step 206), it will reallocate hardware resources for the guest OSs based on the updated hardware information (Step 208). In one or more embodiments of the invention, the resource allocation module will update the host OS's hardware information for the guest OSs based on its determination.

At Step 210, the resource allocation module constructs resource message(s) to send to the guest OS(s). Multiple resource messages may be necessary in the cases where the hardware resources from a first guest OS's are assigned to a second guest OS's. Subsequently, the resource message(s) are sent to the one or more guest OSs (Step 212). For example, the host may use a MPI-formatted message to convey the updated hardware information to the guest OSs. Alternatively, in one or more embodiments of the invention, no resource message will be constructed at Step 210, and an empty resource message may be sent to the guest OSs (Step 212), thus notifying the guest to use its own discovery module for updating the hardware information.

FIG. 3 shows a flowchart for receiving a resource message by the guest OS in accordance with one or more embodiments of the invention. The flow begins at Step 300, where a resource message is received via the guest OS's messaging interface. The guest OS examines the message to determine whether its hardware resources have been reallocated (Step 302). For example, in embodiments of the invention where the guest OS receives the host OS's entire hardware information, the guest OS may extract information about which hardware resources it was assigned from the received hardware information to compare with the guest OS's stored hardware information. If the guest hardware resources have been reallocated, then the hardware information of the guest OS is updated (Step 304).

In one or more embodiments of the invention, the guest OS may be reconfigured by the control process subsequent to updating the hardware information (Step 304). For example, the control process may restart a guest OS running Microsoft® Windows®, because many hardware changes are not recognized by Windows® until a reboot (Microsoft® and Windows® are registered trademarks of Microsoft, Inc. of Redmond, Wash.). Alternatively, the guest OS may continue to execute once the hardware information is updated. In such cases, the control process only modifies the various portions of the guest OS configuration, which do not require restarting of the guest OS.

If the hardware resources assigned to the guest OS were not reallocated, the flow continues to Step 306, and the guest OS makes a determination about whether its hardware resources are adequate. Specifically, the guest OS examines its current and projected workload to determine if it can process the workload in the time requested or required by processes executing on the guest OS. For example, the guest OS may base this determination on one or more metrics including, but not limited to, CPU usage, CPU time, working set size, number of page faults, number of I/O reads and writes, etc.

In one or more embodiments of the invention, when the hardware resources are determined to be inadequate (Step 306), the control process of the guest OS may determine what additional hardware resources are necessary and construct a request (Step 308). For example, a significant working set size or a large number of page faults may prompt the guest OS to request additional memory. In another example, the control process notice a large number of I/O reads and writes and determine that the guest OS requires a storage device with more bandwidth. Once the control process determines hardware resources to request, it sends the resource request to the host. Otherwise, when the guest OS determines that the hardware resources are adequate, the flow ends and no resource request is sent to the host OS.

FIG. 4 shows a flowchart for processing a resource request by the host OS in accordance with one or more embodiments of the invention. At Step 400, the host OS receives a resource request(s) from one or more guest OSs. As discussed above in relation to FIG. 2, in one or more embodiments of the invention, resource requests may be queued for a period of time before the host OS makes a determination to reallocate hardware resources (Step 402). The queuing may to prevent any premature allocation.

At Step 402, the host OS determines whether to reallocate hardware resources based on the resource requests it has received. If the host OS has no available hardware resources, or does not want to allocate additional hardware resources to the guest OSs, the flow ends. However, when the host determines that hardware resources that hardware resource are available or that hardware resources should be reallocated (Step 402), the host OS will reallocate the hardware resources for the guest OSs based on the resource requests (Step 404). The host resource allocation module may use metrics of the entire host system to determine the reallocation of hardware resources. For example, the host may examine the load averages of all the requesting guest OSs to determine which of the guest OSs receives the most memory and CPU resources. In one or more embodiments of the invention, multiple guest OSs may have their hardware resources reallocated in response to the reallocation of their current hardware resource to another guest OS. In one embodiment of the invention, the host resource allocation module determines which guest OSs are affected by the reallocation, constructs resource message(s) and sends them to the affected guest OSs (Step 406).

Figure 5:
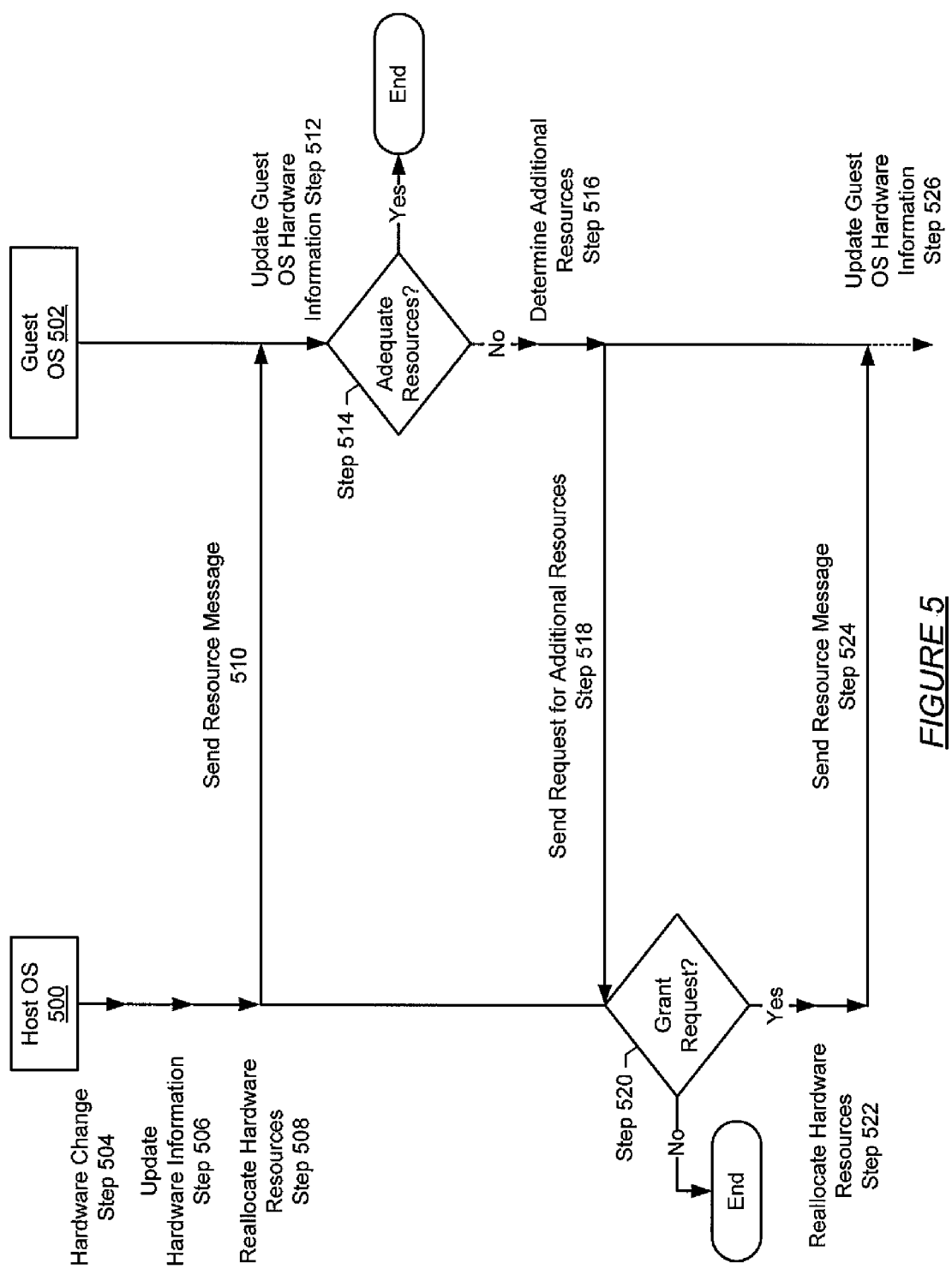
FIG. 5 shows an example in accordance with one or more embodiments of the invention.

FIG. 5 shows an example for sending and receiving resource messages between the host OS (500) and guest OS (502) in accordance with one or more embodiments of the invention. The example is not intended to limit the scope of the invention. The example begins with the host OS (500) detecting a change in its hardware resources (Step 504), triggered by the addition and/or removal of physical hardware. The host OS (500) updates its hardware information with the changes (Step 506), and reallocates the hardware resources. For example, the host OS (500) may reallocate additional memory for the guest OS (502), and update the settings in its memory appropriately.

At Step 510, the host OS sends the updated information in a resource message to the guest OS, and the guest OS updates its hardware information accordingly. For example, if given additional memory, the guest OS's control process will update the hardware information for the guest OS and perform any necessary configuration for the guest OS to recognize the additional memory.

Continuing with FIG. 5, the guest OS determines if its currently allocated hardware resources are adequate (Step 514). When the hardware resources are adequate, the process ends. However, if the hardware resources are not adequate, the guest OS determines what additional hardware resources are required (Step 516). For example, the newly allocated memory may not be local to the processor assigned to the guest OS (502). The non-local memory results in degraded process throughput, and this situation is recognized by the control process of the guest OS (502), which dispatches a resource request for the additional hardware resources to the host OS (Step 518). The host OS examines the resource request to determine whether to provide additional hardware resources (or different hardware resources) to the guest OS (Step 520). For example, if the host has no memory local to the processor of the guest, it cannot allocate any hardware resources and the process ends. Alternatively, when the host OS determines that the resource request can and should be granted, the host OS (500) allocates the new hardware resources (Step 522), and sends a resource message with updated hardware information to the guest OS (Step 524). For example, the host OS (500) may determine that a processor with local memory has become available and may assign it to the guest OS. The guest OS repeats the process by updating its hardware information (Step 526).

In one embodiment of the invention, the guest OS may be configured to communicate utilization (or lack thereof) of assigned resources to the host OS. This communication may be performed using the same mechanisms outlined above for host OS-guest OS communication. Upon receipt of this information, along with similar information from other guest OSs, the host OS could determine how the assigned resources are actually being used by the guest OSs. The host OS may then use this information to determine if reallocation of hardware resources to the guest OSs is required.

In scenarios where a guest OS is not utilizing the hardware resource the host OS had provisioned, the host OS could choose to offer the unused portion of the hardware resource to another guest OS (e.g., by creating another virtualized instance of that hardware resource) to increase utilization of the hardware resource.

Additional, when no guest OS indicates significant utilization of their virtualized resource (i.e., the portion of the hardware resource allocated to the guest OS), the host OS ascertain that utilization of the underlying hardware resource is low. In such cases, the host OS may choose to power manage the underlying hardware resource to improve overall system efficiency.

Figure 6:
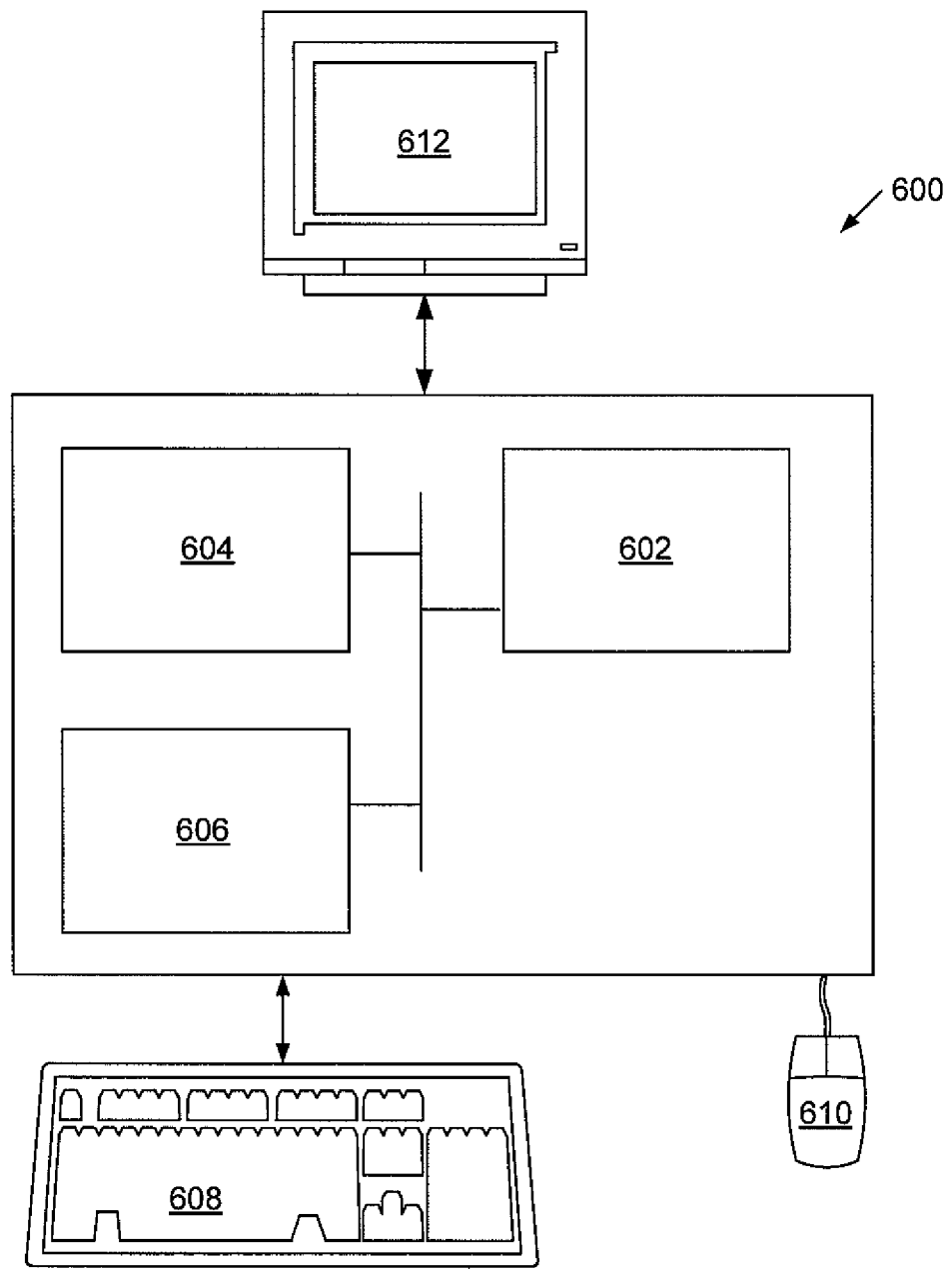
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., host, guest, resource allocation module) may be located on a different node within the distributed system. In one embodiment of the invention, the node corresponds to a computer system. Alternatively, the node may correspond to a processor with associated physical memory. The node may alternatively correspond to a processor with shared memory and/or hardware resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for conveying hardware resources from a host operating system (OS) executing on a host computer system, comprising:
- obtaining, by the host OS, host hardware information, wherein the host hardware information comprises an enumeration of a plurality of hardware components representing the entire host computer system and identifies at least one hardware component in the plurality of hardware components initially allocated to a guest OS executing within the host OS;
- determining, by the host OS and based on changes to the host hardware information, that an update to the initial allocation of hardware components to the guest OS is required;
- in response to determining that the update to the initial allocation is required, changing, by the host OS, the initial allocation of hardware components to the guest OS;
- generating, by the host OS and based on the changed allocation of hardware components to the guest OS, a first update to the host hardware information;
- sending, by the host OS and using a messaging interface, a resource message comprising the first updated host hardware information to the guest OS;
- making a first determination, by the guest OS and based on a comparison of the received first updated host hardware information with the guest OS's stored host hardware information, that hardware components allocated to the guest OS have changed;
- making, after the first determination, a second determination that an additional requirement for a local hardware component of the host computer system is required by the guest OS, wherein the second determination is based on a comparison of the received first updated host hardware information and a projected workload requirement of the guest OS;
- generating, by the guest OS, a resource request for the local hardware component;
- sending, by the guest OS and using the messaging interface, the resource request to the host OS; and
- in response to receiving the resource request, allocating, by the host OS, the local hardware component; and
- generating, by the host OS and based on the additional allocation of the local hardware component to the guest OS, a second update to the host hardware information.

2. The method of claim 1, further comprising:
- sending, by the host OS, a second resource message comprising the second updated host hardware information to the guest OS.

3. The method of claim 2, further comprising:
- configuring the guest OS to use the allocated local hardware component based on the second updated host hardware information.

4. The method of claim 1, further comprising:
- monitoring, by the host OS, the guest OS's usage of its allocated hardware components;
- in response to the monitoring, generating, by the host OS, a third updated host hardware information on the plurality of hardware components of the entire computer system for the guest OS.

5. The method of claim 1, wherein the host hardware information comprises Advanced Configuration and Power Interface (ACPI) tables associated with the host computer system, and wherein the ACPI tables comprises at least one selected from a group consisting of a Static Resource Affinity Table (SRAT), and/or a System Locality Information Table (SLIT).

6. The method of claim 1, wherein the host hardware information comprises a locality of each of the plurality of hardware components.

7. The method of claim 6, wherein changing the initial allocation of hardware components to the guest OS and by the host OS is based on an updated locality information of at least two of the plurality of hardware components.

8. The method of claim 1, wherein changing the initial allocation of hardware components to the guest OS and by the host OS is based on power usage of the hardware components by the guest OS.

9. A non-transitory computer readable medium comprising computer readable program code embodied therein, when executed by a processor, causes a computer system to:
- obtain, by a host operating system (OS) executing on the computer system, host hardware information, wherein the host hardware information comprises an enumeration of a plurality of hardware components representing the entire computer system and identifies at least one hardware component in the plurality of hardware components initially allocated to a guest OS executing within the host OS;
- determine, by the host OS and based on changes to the host hardware information, that an update to the initial allocation of hardware components to the guest OS is required;
- in response to determining that the update to the initial allocation is required, changing, by the host OS, the initial allocation of hardware components to the guest OS;
- generate, by the host OS and based on the changed allocation of hardware components to the guest OS, a first update to the host hardware information;
- send, by the host OS and using a messaging interface, a resource message comprising the first updated host hardware information to the guest OS;
- make a first determination, by the guest OS and based on a comparison of the received first updated host hardware information with the guest OS's stored host hardware information, that hardware components allocated to the guest OS have changed;
- make, after the first determination, a second determination, that an additional requirement for a local hardware component of the computer system is required by the guest OS, wherein the second determination is based on a comparison of the received first updated host hardware information and a projected workload requirement of the guest OS;
- generate, by the guest OS, a resource request for the local hardware component;
- send, by the guest OS and using the messaging interface, the resource request to the host OS; and
- in response to receiving the resource request, allocating, by the host OS, the local hardware component; and
- generate, by the host OS and based on the additional allocation of the local hardware component to the guest OS, a second update to the host hardware information.

10. The non-transitory computer readable medium of claim 9, wherein the computer readable program code further causes the computer system to:
- send, by the host OS, a second resource message comprising the second updated host hardware information to the guest OS.

11. The non-transitory computer readable medium of claim 10, wherein the computer readable program code further causes the computer system to:

configure the guest OS to use the allocated local hardware component based on the second updated host hardware information.

12. The non-transitory computer readable medium of claim 11, wherein the host hardware information comprises Advanced Configuration and Power Interface (ACPI) tables associated with the host computer system, and wherein the ACPI tables comprises at least one selected from a group consisting of a Static Resource Affinity Table (SRAT), and/or a System Locality Information Table (SLIT).

13. The non-transitory computer readable medium of claim 9, wherein the host hardware information comprises a locality of each of the plurality of hardware components.

14. The non-transitory computer readable medium of claim 13, wherein changing the initial allocation of hardware components to the guest OS and by the host OS is based on an updated locality information of at least two of the plurality of hardware components.

15. The non-transitory computer readable medium of claim 9, wherein changing the initial allocation of hardware components to the guest OS and by the host OS is based on power usage of the hardware components by the guest OS.

16. A computer system, comprising:
a plurality of hardware components, including a processor;
a host operating system (OS), executing on the processor; and
a first guest OS and a second guest OS executing in the host OS,
wherein the host OS is configured to:
    obtain host hardware information, wherein the host hardware information comprises an enumeration of a plurality of hardware components representing the entire computer system and identifies at least one hardware component in the plurality of hardware components initially allocated to the first guest OS,
    determine, based on changes to the host hardware information, that an update to the initial allocation of hardware components to the first guest OS is required,
    in response to determining that the update to the initial allocation is required, change the initial allocation of hardware components to the first quest OS,
    generate, based on the changed allocation of hardware components to the first guest OS, a first update to the host hardware information,
    send, using a messaging interface, a resource message comprising the first updated host hardware information to the first guest OS,
    in response to receiving a resource request from the first guest OS, allocate a local hardware component requested by the first guest OS, and
    generating, based on the additional allocation of the local hardware component to the guest OS, a second update to the host hardware information,
and wherein the first guest OS is configured to:
    receive the first updated host hardware information from the host OS,
    make a first determination, based on a comparison of the received first updated host hardware information with its stored host hardware information, that hardware components allocated to the first guest OS have changed,
    make, after the first determination, a second determination, that an additional requirement for a local hardware component of the computer system is required, wherein the second determination is based on a comparison of the received first updated host hardware information and a projected workload requirement of the first guest OS,
    generate the resource request for the local hardware component, and
    send, using the messaging interface, the resource request to the host OS.

17. The computer system of claim 16, wherein a configuration of the first guest OS is modified in response to receiving the first updated host hardware information.

18. The computer system of claim 16, wherein the host OS is further configured to:
send an empty resource message to the first guest OS, wherein the empty resource message indicates to the first guest OS that the first guest OS is to use a discovery module to obtain the host hardware information.

19. The computer system of claim 16, wherein the first guest OS is configured to:
determine a usage of its allocated hardware components; and
send, using the messaging interface, a message specifying the usage of its allocated hardware components to the host OS.

20. The computer system of claim 16, wherein the host hardware information comprises Advanced Configuration and Power Interface (ACPI) tables associated with the computer system.

* * * * *

UNITED STATES PATENT AND TRADEMARK OFFICE
CERTIFICATE OF CORRECTION

PATENT NO. : 8,762,999 B2  
APPLICATION NO. : 11/863157  
DATED : June 24, 2014  
INVENTOR(S) : Johnson et al.

It is certified that error appears in the above-identified patent and that said Letters Patent is hereby corrected as shown below:

In the Specification

In column 1, line 10, delete "that that" and insert -- that --, therefor.

In column 5, line 35, delete "OS s" and insert -- OSs --, therefor.

Signed and Sealed this  
Third Day of March, 2015

Michelle K. Lee  
*Deputy Director of the United States Patent and Trademark Office*